United States Patent
Mattsson (10) Patent No.: US 8,693,954 B2
(45) Date of Patent: Apr. 8, 2014

(54) INTERFERER REDUCTION

(75) Inventor: Ulf Mattsson, Kungsbacka (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 445 days.

(21) Appl. No.: 12/999,531

(22) PCT Filed: Jun. 25, 2008

(86) PCT No.: PCT/SE2008/050770
§ 371 (c)(1),
(2), (4) Date: Dec. 16, 2010

(87) PCT Pub. No.: WO2009/157829
PCT Pub. Date: Dec. 30, 2009

(65) Prior Publication Data
US 2011/0092162 A1      Apr. 21, 2011

(51) Int. Cl.
*H04B 1/00*        (2006.01)

(52) U.S. Cl.
USPC .................. 455/63.1; 455/114.2; 455/296

(58) Field of Classification Search
USPC ...................... 455/63.1, 114.2, 296
See application file for complete search history.

(56) References Cited

U.S. PATENT DOCUMENTS

| | | | |
|---|---|---|---|
| 2003/0016174 A1* | 1/2003 | Anderson | 342/378 |
| 2004/0070386 A1* | 4/2004 | Muto et al. | 324/76.29 |
| 2004/0203458 A1 | 10/2004 | Nigra | |
| 2005/0095985 A1* | 5/2005 | Hafeoz | 455/67.11 |
| 2007/0098090 A1* | 5/2007 | Ma et al. | 375/260 |
| 2007/0184782 A1 | 8/2007 | Sahota et al. | |
| 2009/0135972 A1* | 5/2009 | Tanaka et al. | 375/346 |

FOREIGN PATENT DOCUMENTS

EP            1005181 A1      5/2000

* cited by examiner

*Primary Examiner* — Wen Huang
(74) *Attorney, Agent, or Firm* — Rothwell, Figg, Ernst & Manbeck, P.C.

(57) ABSTRACT

The invention is directed to a method for reducing the influence of an interfering signal $S_i$ on a wanted signal $S_w$ in a first frequency channel n received by a receiver 112a' when the interfering signal $S_i$ occurs in a second frequency channel n+1 near to the first channel n. The method comprises the steps of: assuming a model $S_x$ of a transmitter 120b' causing the interfering signal $S_i$; obtaining in the first channel n a measure of the wanted signal $S_w$ and a measure of a nonlinear part of the interfering signal $S_i$, and in the second channel n+1 a measure of a linear part of the interfering signal $S_i$; solving the model for said transmitter 120b' by using the measured linear and nonlinear part; and obtaining the interfering signal $S_i$; influencing the first channel n by using the solved model, and subtracting the obtained interfering signal S1 from the wanted signal $S_w$ received by the receiver 112a'.

19 Claims, 10 Drawing Sheets

INTERFERER REDUCTION

CROSS-REFERENCE TO RELATED APPLICATION

This application is a 35 U.S.C. §371 National Phase Entry Application from PCT/SE2008/050770, filed Jun. 25, 2008, and designating the United States.

TECHNICAL FIELD

The invention is related to communication between nodes in a wireless communication network. More particular, the invention is related to a reduction of an interfering signal received by a node in a wireless communication network.

BACKGROUND

Today, high capacity communication by wireless transmissions is a common phenomenon. The development and deployment of wireless cellular network have been particularly successful. A cellular network is a radio network made up of a number of radio cells each served by a fixed transceiver, known as a cell site or base station. As is well known, the cells in a cellular network are used to cover different areas in order to provide radio coverage over a wider area than the area of one single cell. A common example of a cellular network is the cell phone networks, wherein signals are communicated by means of radio waves between a mobile telephone or a similar portable communication device and a cell site (base station) or a similar access point.

There are a number of different cellular network technologies, including but not limited to: Global System for Mobile Communications (GSM), General Packet Radio Service (GPRS), Enhanced Data rates for GSM Evolution (EDGE), Universal Mobile Telecommunications System (UMTS) being standardized by the Third Generation Partnership Project (3GPP) including but not limited to 3GPP LTE (Long Term Evolution), Code Division Multiple Access (CDMA), Evolution-Data Optimized (EV-DO), Worldwide Interoperability for Microwave Access (WiMAX), Digital Enhanced Cordless Telecommunications (DECT), Digital AMPS (IS-136/TDMA), Integrated Digital Enhanced Network (iDEN) and similar. The invention described herein is applicable mutatis mutandis to substantially all cellular network technologies mentioned above and their similar and/or equivalent counterparts.

In cellular networks strong interferers may cause general problems for base stations or similar access points. This is particularly so if the interferer appears very close to the access point. A strong interferer may then block the base station, even if the interferer operates on another frequency channel near or adjacent to the channel selected and/or wanted by the access point in question.

A strong interferer as mentioned above may e.g. be present very close to the base station when a so called "femto base" is used. A femto base is a small cellular base station arrangement with a short range designed to be used by cell phones in a residential area or in a small business environment. Typically the short range femto base is connected to the core network of a cellular network via a communication network. In turn the cellular network comprises ordinary base stations with a long range. The range of at least one ordinary base station may cover the range of the femto base. The communication network connecting the femto base to the cellular network may e.g. be the Internet to which the femto base may be connected via a Broadband connection or similar, e.g. a Digital Subscriber Line (DSL) providing 24 Mbit/s provided via the wires of a local telephone network. A typical femto base arrangement incorporates the functionality of an ordinary base station but extended to allow a simpler, self contained deployment. For example, a UMTS femto base may contain a Node B, a Radio Network Controller (RNC) and a Gateway Support Node (GSN) with Ethernet for backhaul. When a cell phone leaves the residential area or the small business environment a handover is conducted to an ordinary base station with a longer range.

Some technical aspects of femto bases and similar access points have e.g. been studied and reported by the 3GPP in the UMTS specification TR 25.820 V8.000 (2008-03), with the title "3G Home Node B Study Item Technical Report". Although much attention is focussed on UMTS, the concept is applicable to substantially all cellular technologies including those mentioned above and similar.

To illustrate the severity of a strong interferer near the base station we assume that a small base station such as a Home Node B or similar is used in a residential area as a part of a first cellular network provided by a first network operator. A first User Equipment (UE) being connected to the first network can then perform handover from an ordinary Node B to the Home Node B when the first UE is sufficiently close to the Home Node B. Once in the residential area the first UE will typically operate within a few meters from and often in line of sight to the Home Node B. The UE and the Home Node B may even be located in the same room. Hence, due to the short distance the Home Node B will instruct the first UE to reduce its output power accordingly.

Now, assume that a second UE being connected to a second cellular network provided by a second network operator enters the room wherein the first UE and the Home Node B are located. The second UE cannot perform handover to the Home Node B since the second UE is connected to another network. Instead, the second UE will maintain or seek connection with an ordinary Node B in the second network, which may be located hundred of metres or even kilometres from the second UE. Hence, the second UE will transmit with a much higher power than the first UE. If we assume that the first network and the second network operate under the same cellular technology (e.g. UMTS) then the frequency band used by the first network and the frequency band used second network may be quite close. This implies that sidebands of the powerful transmissions from the second UE will fall within the frequency band of the Home Node B, which will experience a strong interfering signal. Moreover, since the Home Node B is a part of the first network and the second UE is a part of the second network it follows that the Home Node B has no means for instructing the second UE to lower its output power.

To increase the signal to interferer ratio and thus to reduce the influence from the interferer one might consider to use the well known space diversity at the receiver end. However, the use of space diversity presupposes different air paths caused by reflections etc. When the interferer is very close to the base station the interferer will most likely be in line of sight to the base station, i.e. any reflections are negligible compared to the one strong path. Hence, space diversity will work very poorly or not at all with respect to such interferers.

In view of the above it would be beneficial to provide a method and a device for a simple and efficient reduction or elimination of a strong interferer situated very close to a base station or similar access point in a cellular network or similar, preferably when the interferer operates under the same radio network technology as the access point.

SUMMARY

An object of the present invention is to provide a solution that enables at least one of: a simple and efficient reduction or even an elimination of an interfering signal transmitted very close to a base station in a cellular network. Particular embodiments of the invention are directed to reducing or eliminating an interferer that operates under the same cellular technology as the base station in question.

This object has been achieved by a first aspect of the invention providing a method for reducing the influence of an interfering signal on a wanted signal in a first frequency channel received by a receiver. It is assumed that the interfering signal occurs in a second frequency channel near to the first channel. According to the method a model of the transmitter causing the interfering signal is assumed. Moreover, a measure is obtained in the first channel of both the wanted signal and a nonlinear part of the interfering signal. Similarly, a measure is obtained in the second channel of a linear part of the interfering signal. Then, the model assumed for the transmitter is solved by means of the measured linear and nonlinear parts, and the part of the interfering signal that influences the first channel is obtained by using the solved model. The obtained interfering signal is then subtracted from the wanted signal received by the receiver.

In an embodiment of the invention it is preferred that the receiver comprises a first receiving branch and a second receiving branch for supporting space diversity. However, the benefits from space diversity are small when the interfering transmitter is located near to the interfered receiver, particularly if it transmits with a comparably high power. Hence, in stead of using diversity the wanted signal can be obtained in one branch of the receiver whereas the linear and non linear parts of the interfering signal can be obtain in the other branch. This makes it possible to obtain the wanted signal by a narrowband reception in the first branch tuned to the first channel, whereas the interfering signal can be obtained independently by a required broadband reception in the second branch tuned so as to span the first channel and the second channel. The narrowband reception of the wanted signal improves the Signal to Interferer Ratio (SIR). In addition, the utilisation of the diversity branches as indicated above can be accomplished with substantially no additional hardware, particularly since a typical implementation of the method is made by software using the existing hardware in the receiver.

It should be emphasized that the term "comprises/comprising" when used in this specification is taken to specify the presence of stated features, integers, steps or components, but does not preclude the presence or addition of one or more other features, integers, steps, components or groups thereof.

Further advantages and advantageous features of the invention are disclosed in the following description and in the dependent claims.

BRIEF DESCRIPTION OF THE DRAWINGS

A more detailed description of the present invention is given below with reference to a plurality of exemplifying embodiments as illustrated in the appended figures, wherein.

DETAILED DESCRIPTION OF PREFERRED EMBODIMENTS

Figure 1A:
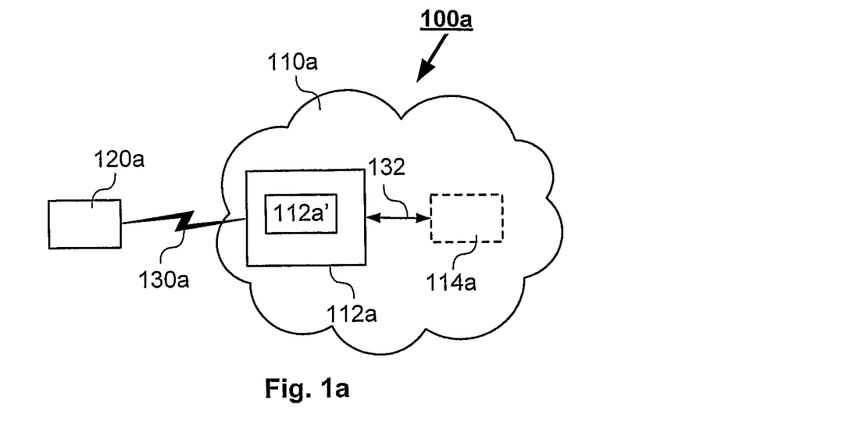
FIG. 1a is a schematic illustration of a first exemplifying wireless communication system 100a according to an embodiment of the present invention.

FIG. 1a is a schematic illustration of a first exemplifying wireless communication system 100a comprising an embodiment of the present invention. The communication system 100a comprises a first wireless communication network 110a and at least a first mobile terminal 120a.

In turn the first wireless communication network 110a of the system 100a comprises at least a first access point arrangement 112a having a receiver 112a'. It is preferred that the first access point 112a is a part of a radio access network of the communication network 110a. In particular, the first access point 112a may form or comprises a short range base station arrangement such as e.g. a Home Node B or a femto base or similar adapted to enable wireless communication between the first mobile terminal 120a and the network 110a via an air interface 130a. In turn, the first access point 112a may be connected to a node arrangement 114a in the first communication network 110a via a connection 132. The node arrangement 114a may be a part of a core network or similar of the communication network 110a and the connection 132 between the first access point 112a and the node arrangement 114a may e.g. be formed by the Internet to which the access point 112a may be connected via a Broadband connection or similar, e.g. a Digital Subscriber Line (DSL) or any other suitable connection.

It is preferred that the wireless communication system 100a is a cellular communication system, e.g. according to any of the 3GPP specifications, e.g. according to the UMTS.

Similarly, it is preferred that the terminal 120a is a User Equipment (UE) or similar and that the air interface 130a is based on e.g. Wideband Coded Multiple Access (WCDMA) or any other radio network technology presupposed and/or defined in the 3GPP specifications. However other cellular network technologies are conceivable, e.g. any of the cellular network technologies mentioned above in the background section.

Figure 1B:
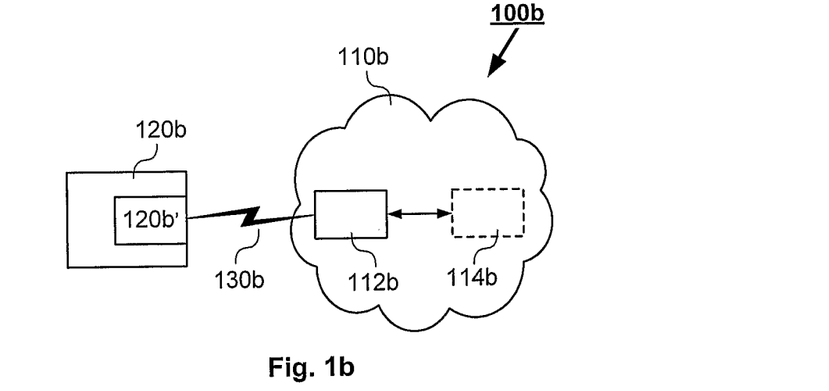
FIG. 1b is a schematic illustration of another wireless communication system 100b.

FIG. 1b is a schematic illustration of a second exemplifying wireless communication system 100b. It is preferred that the second wireless communication system 100b is based on the same radio network technology as the first wireless communication system 100a. However other cellular network technologies are conceivable.

As can be seen in FIG. 1b the communication system 100b comprises a second wireless communication network 110b and at least a second mobile terminal 120b comprising a radio transmitter 120b' adapted to transmit over an air interface 130b. The network 110b comprises at least a second access point arrangement 112b which is a part of a radio access network of the communication network 110b. In particular, the second access point 112b may form or comprise a base station arrangement (e.g. an ordinary Node B or similar) having a wider range than the first access point 112a and being adapted to enable wireless communication between the second mobile terminal 120b and the communication network 110b via the air interface 130b. The second access point 112b may be connected to a further node arrangement 114b in the communication network 110b, which may be a part of a core network of the communication network 110b.

Figure 2:
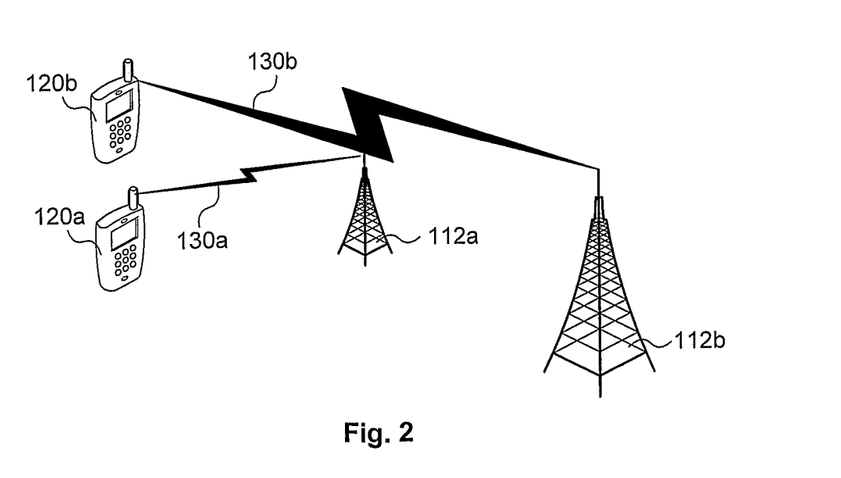
FIG. 2 is a schematic illustration of a first UE 120a and a second UE 120b arranged within the first small coverage area of a first access point 112a, and within the larger coverage area of a second access point 112b.

FIG. 2 is a schematic illustration of an exemplifying situation in which the first mobile terminal 120a and the first access point 112a are assumed to be located in a residential area or similar and particularly within the coverage area of the first access point 112a. It is assumed that a power adjustment is in place. As is well known to those skilled in the art, this implies that the first access point 112a instructs the first mobile terminal 120a to reduce the power of its output signal as the distance between the terminal 120a and the access point 112a decreases. This has been illustrated in FIG. 2 by a small thin arrow representing the signal over the air interface 130a. It is likewise assumed that the second mobile terminal 120b is located very near to the first access point 112a, e.g. located within a few meters and possibly in line of sight with respect to the first access point 112a. However, the second mobile terminal 120b is assumed to communicate with the second access point 112b being located hundred of metres or even kilometres from the second mobile terminal 120b. Hence, the second mobile terminal 120b will transmit with a much higher power than the first mobile terminal 120a. This has been illustrated in FIG. 2 by a large thick arrow representing the signal over the air interface 130b. Hence, the first access point 112a will experience a powerful interfering signal $S_i$ transmitted by the second mobile terminal 120b, particularly if the frequency channel of the first access point 112a is near or adjacent to the frequency channel of the interfering signal $S_i$.

Figure 3A:
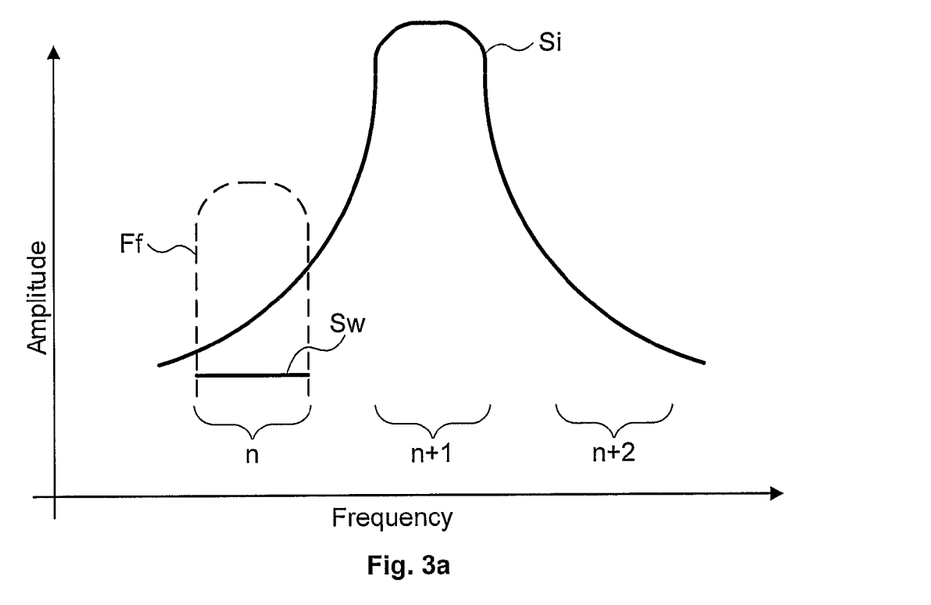
FIG. 3a is a schematic illustration of the frequency characteristics of an exemplifying interfering signal $S_i$, and the frequency characteristics of an exemplifying receiver filter function $F_f$ in the first access point 112a defining at least one selected and/or wanted frequency channel n.

FIG. 3a is a schematic illustration showing the frequency characteristics of an exemplifying interfering signal $S_i$ transmitted by the second mobile terminal 120b over the air interface 130b, and the frequency characteristics of a receiver filter function $F_f$ in the first access point 112a. It is preferred that the receiver filter function $F_f$ defines a first frequency channel n, and that the interfering signal $S_i$ occurs within a second frequency channel n+1. It is also preferred that the second frequency channel n+1 is near or adjacent to the first frequency channel n. This may e.g. be the case if the first system 100a allocates a lower frequency channel n for its radio access network comprising the access point 112a and the mobile terminal 120a, whereas the second system 100b allocates an adjacent higher frequency channel n+1 for its radio access network comprising the access point 112b and the mobile terminal 120b. This may e.g. be the lo case when WCDMA within the UMTS defined by the 3GPP is used as the radio network technology for the first and the second communication systems 110a, 110b. The channels n and n+1 in FIG. 3a may then be e.g. approximately adjacent and approximately 5 MHz wide.

Hence, if we assume that the first and second networks 110a, 110b operate under the same radio network technology and that the frequency channels n and n+1 are adjacent it follows that sidebands of the high power signal $S_i$ transmitted from the second mobile terminal 120b on the frequency channel n+1 will occur within the frequency channel n of the first access point 112a. The first access point 112a will therefore receive a strong interfering signal. Moreover, since the first access point 112a is a part of the first network 110a and the second mobile terminal 120b is a part of the second network 110b it follows that the first access point 112a has no means for instructing the second mobile terminal 120b lower its output power.

However, due to signal processing gain and the properties of a radio transmission based on WCDMA technology or similar it is possible to receive and detect a wanted signal $S_w$ with a power level that is below the sideband power level of the interfering signal $S_i$ in the wanted channel n. This makes it possible to use the part of the high power interferer signal $S_i$ occurring in the wanted channel n to obtain an accurate model for the nonlinearity of the interfering signal $S_i$ caused by the transmitter 120b' of the second mobile terminal 120b. Once a model for the nonlinearity of the interfering signal $S_i$ has been obtained it will be possible to reduce the level of the interfering signal $S_i$ within the wanted channel n, not necessarily below the level of the wanted signal $S_w$ but enough to make the wanted signal $S_w$ possible to detect.

Figure 3B:
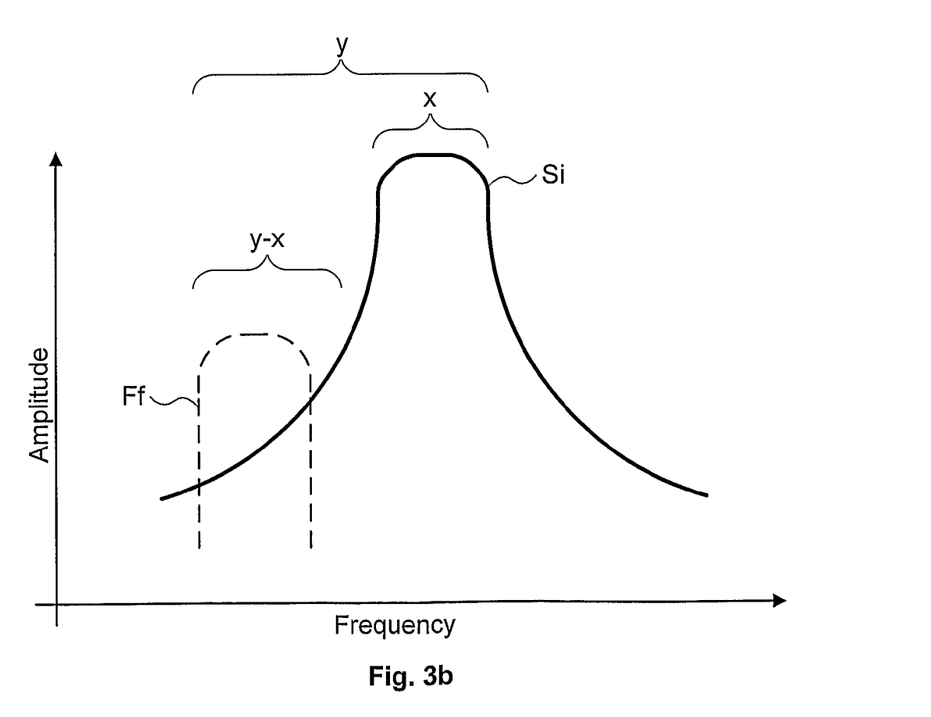
FIG. 3b is another schematic illustration of the frequency characteristics in FIG. 3a, FIG. 4 is a flowchart illustrating a method according to an exemplifying embodiment of the present invention.
Figure 4:
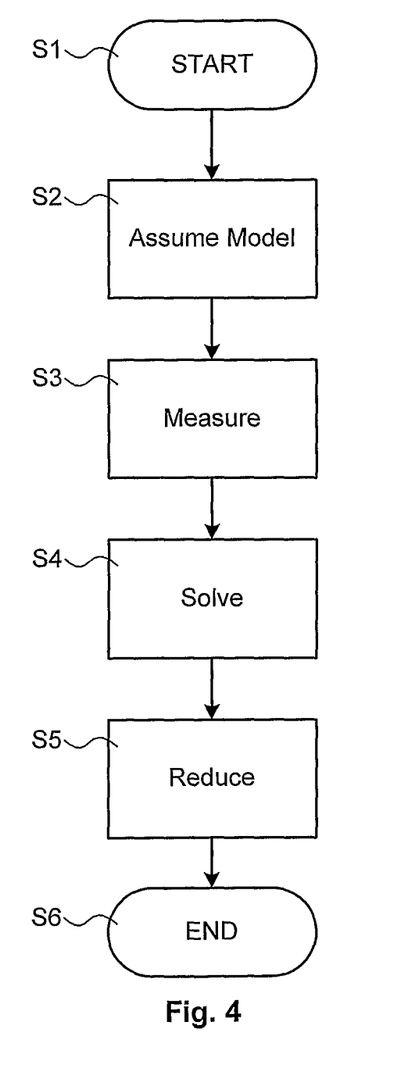

The issue at hand is schematically illustrated in FIG. 3b, showing another schematic illustration of the frequency characteristics in FIG. 3a. Here, a frequency span y comprises the adjacent frequency channels n and n+1. The interfering signal $S_i$ is assumed to occur at a span of x frequencies within channel n+1. It follows that the part of the interfering signal $S_i$ that occurs in the wanted channel n corresponds to the frequencies y-x.

Now, the level of the interfering signal $S_i$ within the wanted channel n can be reduced by a method according to an embodiment of the present invention comprising the following steps:

In a first step S1 some initial measures may be needed as a starting step.

In a second step S2, to obtain a model of the nonlinearity of the interfering signal $S_i$ we need to assume a model (i.e. a transfer function) for the transmitter causing the spectrum of the interfering signal $S_i$, i.e. we need to assume a model for the transmitter in the second mobile terminal 120b. The model is preferably a nonlinear dynamic model which is constantly updated by measuring the received spectrum.

In a third step S3 we need at least one measure in the second channel n+1 comprising frequency information about a linear part of the interfering signal $S_i$, and one measure in the wanted channel n comprising frequency information about at least one nonlinear part of the interfering signal $S_i$. It is preferred that the nonlinear part is related to the linear part.

In a fourth step S4 we will solve the assumed model based on said measurements of the interfering signal $S_i$. In particular, the model will be solved with respect to parameters defining the assumed model, i.a. parameters indicative of the original signal T being fed to the transmitter 120b' of the second mobile terminal 120b causing the interfering signal $S_i$.

In a fifth step S5 we will use the solved model to subtract the interfering signal $S_i$ influencing the wanted channel n from the signal in the wanted channel n received by the receiver 112a' of the first access point 120a. To accomplish this it is preferred that the interfering signal $S_i$ is obtained by providing the solved model with solved parameters indicative of the signal original T being fed to the transmitter 120b' of the second mobile terminal 120b. The interfering signal $S_i$ in the wanted channel n is then subtracted from the signal in the wanted channel n received by the receiver 112a' of the first access point 120a. The interfering signal $S_i$ in the wanted channel n can e.g. be accomplished by passing the interfering signal $S_i$ through a band-pass filter tuned to the wanted frequency channel n. It should be emphasized that the expression "subtract the interfering signal $S_i$ influencing the wanted channel n from the signal in the wanted channel n" does not preclude that parts of the interfering signal $S_i$ remains in the wanted channel n after subtraction. Rather, the subtraction reduces or eliminates the influence of the interfering signal $S_i$ in the wanted channel n.

The steps S1 to S5 above and the character of the receiver arrangement in the first access point 112a will be elaborated in detail below with reference to exemplifying methods illustrated by the flow chart in FIG. 3 and exemplifying structures illustrated by FIGS. 1a, 4, 5, 6, 7 and 9.

In the first initial step S1 of an exemplifying method it is assumed that the first access point 112a receives a wanted low power signal $S_w$ from the first mobile terminal 120a and an interfering high power signal $S_i$ from the second mobile terminal 120b. It is also assumed that the wanted low power signal $S_w$ is transmitted within a wanted first frequency channel n and that the interfering high power signal $S_i$ is transmitted within second frequency channel n+1 being near or adjacent to the first frequency channel n. These assumptions should be familiar from the description above. In addition it is assumed that the first access point 112a has already detected the presence of the strong interfering signal $S_i$ and has taken the appropriate initial actions for a subsequent elimination or reduction of the interfering signal $S_i$ according to an embodiment of the present invention.

In a second step S2 of the exemplifying method it is preferred that a model (i.e. a transfer function) of the transmitter causing the spectrum of the interfering signal $S_i$ is assumed, i.e. we need to assume a model for the transmitter 120b' in the second mobile terminal 120b.

The transfer function of a general non ideal transmitter can e.g. be modeled by the following expression:

$$S_T = a_1 \cdot T + a_2 \cdot T^2 + a_3 \cdot T^3 + a_4 \cdot T^4 + a_5 \cdot T^5 \ldots a_n T^n \tag{1}$$

Here, the variable T is an input signal to the transmitter 120b', whereas $a_1$, $a_2$, $a_3$, $a_4$, $a_5$ to $a_n$ are coefficients that define the linear properties of the transmitter 120b'. The output signal $S_T$ from the transmitter 120b' is received as the interfering signal $S_i$ by the first access point 112a. The term $a_1 \cdot T$ is a linear term with $a_1$ being the gain of the transmitter 120b'. The second order nonlinearity is given by $a_2 \cdot T^2$, the third order nonlinearity is given by $a_3 \cdot T^3$ and so on to the nth order nonlinearity which is given by $a_n \cdot T^n$. Coefficients $a_2$, $a_3$, $a_4$, $a_5$ to $a_n$ determines the amount of the second, third, fourth, fifth to nth order nonlinearity respectively. For an ideal transmitter, $a_2$, $a_3$, $a_4$, $a_5$ to $a_n$ are equal to zero. These facts are well known to those skilled in the art and they need no further description.

Before we proceed it should be emphasised that expressions being similar or equivalent to expression (1) can be used as models of the transmitter 120b' in the second mobile terminal 120b. Thus, the invention is not limited to expression (1) as such.

Now, since the second frequency channel n+1 with the interfering signal $S_i$ is near or adjacent to the wanted frequency channel n it follows that particularly a $3^{rd}$ order nonlinearity of the interfering signal $S_i$ is the most likely to cause the major part of the interference in the wanted channel n. The other nonlinearities are typically less relevant since they have a lower power and/or occur at frequencies sufficiently remote from the wanted signal $S_w$ in the first frequency channel n. Therefore, to simplify the model in expression (1) it is preferred that the other nonlinearities are disregarded.

Thus, in a preferred embodiment of the present invention we assume that the transfer function of the transmitter 120b' in the second mobile terminal 120b can be modelled by the following simplified expression:

$$S_T = a_1 \cdot T + a_3 T^3 \tag{2}$$

As explained above, the term $a_1 \cdot T$ is a linear term with $a_1$ being the gain of the transmitter 120b' and the term $a_3 \cdot T^3$ defines the third order nonlinearity of the transmitter 120b.

In a third step S3 of the exemplifying method it is preferred that at least one measure of the interfering signal $S_i$ is obtained. It is preferred that said measure(s) comprises information about the interfering signal $S_i$ occurring at a span of x frequencies within the second frequency channel n+1, and information about at least one nonlinearity of the interfering signal $S_i$ occurring in the first channel n. More particularly, since we assume that the transfer function of the transmitter 120b' can be modelled by the simplified expression in (2) it is preferred that the measure of the interfering signal $S_i$ comprises information about a linear term $a_1 \cdot T$ of the interfering signal $S_i$ occurring in the second channel n+1 and information about the third order nonlinearity $a_3 \cdot T^3$ of the interfering signal occurring in the first channel n.

Figure 5:
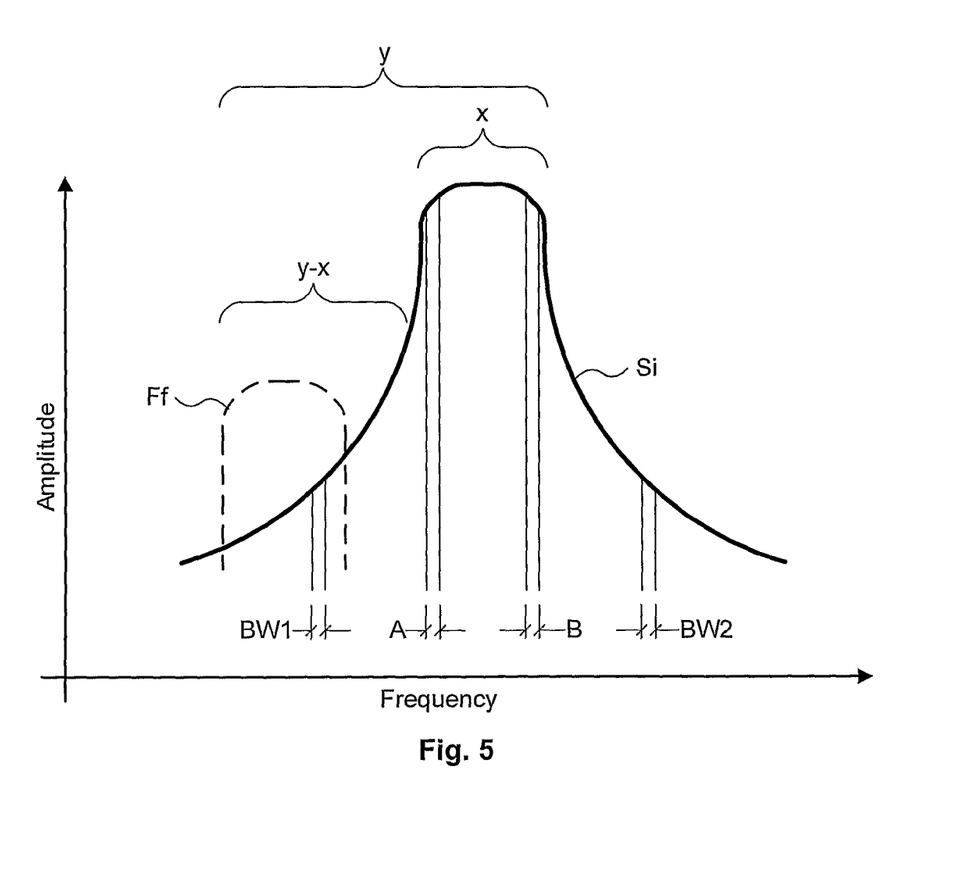
FIG. 5 is a schematic illustration of one exemplifying way of obtaining a relevant measure for determining the model of the transmitter 112b'.

FIG. 5 is a schematic illustration of an exemplifying manner of obtaining a relevant measure. The interfering signal $S_i$ and the receiver filter function $F_f$ in FIG. 5 is the same as previously described with reference to FIGS. 3a and 3b. In FIG. 5 it is assumed that a first and a second band-pass filter A and B are tuned in to the second channel n+1 for measuring signals comprising info about the linear term $a_1 \cdot T$ of the interfering signal $S_i$. It is preferred that filter A is tuned to a lower frequency edge and that filter B is tuned in to a higher frequency edge of the span of x frequencies at which the interfering signal $S_i$ occurs. Furthermore, it is preferred that the band-pass filters A and B are narrow so that they each approximately detect substantially one frequency of the interfering signal $S_i$, i.e. the band-pass filters A, B are each preferably detecting substantially one single frequency component of the interfering signal $S_i$, including the case of detecting very few frequency components of the interfering signal $S_i$.

Moreover, in FIG. 5 it is assumed that a third band-pass filter BW1 is tuned in to the wanted channel n for detecting signals comprising information about the third order nonlinearity $a_3 \cdot T^3$ of the signals detected by filters A and B. Similarly, a fourth band-pass filter BW2 is tuned in to a third frequency channel n+2 for detecting signals comprising information about the third order nonlinearity $a_3 \cdot T^3$ of the signals detected by filters A and B. It is preferred that the band-pass filters BW1, BW2 are narrow so that they each approximately detect substantially one frequency of the nonlinearity caused by the signals detected by filters A and B, i.e.

the band-pass filters BW1, BW2 are each detecting substantially one single frequency component, including the case of detecting very few frequency components.

Given the above it is clear to those skilled in the art that if we as an example assume a frequency $f_A$ detected by filter A and a frequency $f_B$ detected by filter B it follows that the third band-pass filter BW1 is tuned to a first third order intermodulation product with the frequency $2f_A-f_B$ and that the fourth band-pass filter BW2 is tuned to a second third order intermodulation product with the frequency $2f_B-f_A$.

Before we proceed it should be emphasized that the channels n, n+1 and n+2 mentioned above may e.g. be WCDMA channels under the UMTS defined by the 3GPP, which channels may be e.g. approximately 5 MHz wide and approximately adjacent to each other. Alternatively the channels n, n+1 and n+2 may e.g. be any other channel similar to and/or equivalent to said WCDMA channel, possibly being defined in the 3GPP specifications.

Figure 6:
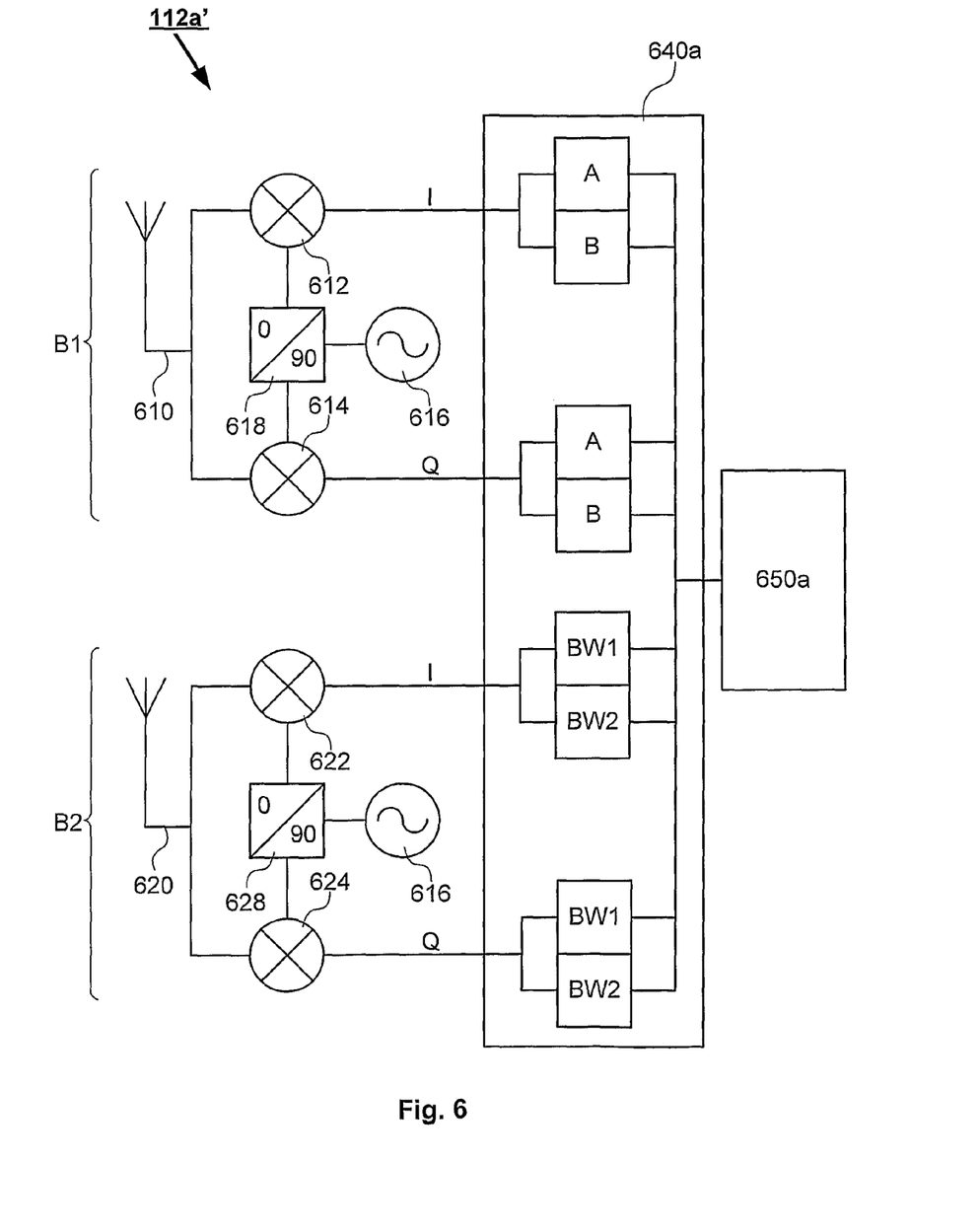
FIG. 6 shows a schematic illustration of a broadband solution provided in the receiver 112a' comprising a measuring unit 640a implementing the band-pass filters A, B, BW1 and BW2.

FIG. 6 shows a schematic illustration of a broadband solution provided in the receiver 112$a'$ comprising a measuring unit 640$a$ implementing the band-pass filters A, B, BW1 and BW2 described above. As can be seen in FIG. 6 the receiver 112$a'$ supports space diversity by using a first receiver branch and a second receiver branch. The first branch comprises an antenna 610 connected to an I-channel mixer 612 and a Q-channel mixer 614, an oscillator 616 connected to a 90° phase changer 618 which in turn is connected to the two mixers 612, 614 for down converting the signal received by the antenna 610 and creating the I- and Q-channel. Likewise, the second branch comprises an antenna 620 connected to an I-channel mixer 622 and a Q-channel mixer 624, an oscillator 616 connected to a 90° phase changer 628 which in turn is connected to the two mixers 622, 624 for down converting the signal received by the antenna 620 and creating the I- and Q-channel. The parts and functions of the receiver 112$a'$ described above are well known to those skilled in the art and they need no further description.

Moreover, the first diversity branch of the embodiment in FIG. 6 comprises the above described first band-pass filter A and second band-pass filter B for measuring the linear term $a_1 \cdot T$ of the interfering signal $S_i$ in the second channel n+1. The first and second band-pass filters A and B is each connected to both the I-channel and the Q-channel of the first diversity branch. Likewise, the second diversity branch comprises the third and the fourth band-pass filter BW1 and BW2 for measuring the third order nonlinear term $a_3 \cdot T^3$ of the signals detected by filters A and B. The third and the fourth band-pass filter BW1 and BW2 is each connected to both the I-channel and the Q-channel of the second diversity branch.

In addition, the embodiment in FIG. 6 comprises a calculation unit 650$a$ adapted to solve the assumed model $S_T = a_1 \cdot T + a_3 \cdot T^3$ in (2) of the nonlinearities in the interfering signal $S_i$, i.e. the transfer function of the transmitter 120$b'$ as described above with reference to expression (2). The calculation unit 650$a$ is connected to the outputs of the band-pass filters A, B, BW1, BW2 so as to be provided with the filtered signals from these filters. The calculation unit 650$a$ may be implemented by means of hardware and/or software, and it may comprise one or several hardware units and/or software modules, e.g. one or several separate processor arrangements provided with or having access to the appropriate software and hardware required for the functions to be performed. In view of the above, assume for explanatory purposes that a simplified composite signal T comprising a first sinus wave $f_A = A \cdot \cos(\omega_A t + \Phi_A)$ and a second sinus wave $f_B = B \cdot \cos(\omega_B t + \Phi_B)$—i.e. $T = A \cdot \cos(\omega_A t + \Phi_A) + B \cdot \cos(\omega_B t + \Phi_B)$—is amplified and transmitted by the transmitter 120$b'$ in the second mobile terminal 120$b$. Given that $f_A$ is detected by filter A and $f_B$ is detected by filter B and that the nonlinearity of the transmitter 120$b'$ is described by the model in expression (2) above the interfering signal $S_i$ received by the receiver 112$a'$ in the first access point 112$a$ can be expressed as:

$$S_i = S_T = a_1 \cdot (A \cdot \cos(\omega_A t + \Phi_A) + B \cdot \cos(\omega_B t + \Phi_B)) + a_3 \\ (A \cdot \cos(\omega_A t + \Phi_A) + B \cdot \cos(\omega_B t + \Phi_B))^3 \quad (3)$$

The fundamental tone in the band-pass filters A, B, BW1, BW2 will then be:

$$\text{Tone in A: } (a_1 A + 1.5 a_3 \cdot A \cdot B^2 + 0.75 a_3 \cdot A^3) \cdot \cos(\omega_A t + \Phi_A) \quad (4)$$

$$\text{Tone in B: } (a_1 B + 1.5 a_3 \cdot B \cdot A^2 + 0.75 a_3 \cdot B^3) \cdot \cos(\omega_B t + \Phi_B) \quad (5)$$

$$\text{Tone in BW1: } 0.75 A^2 \cdot B \cdot a_3 \cdot \cos(2\omega_A t + 2\Phi_A + \omega_B t + \Phi_B) \quad (6)$$

$$\text{Tone in BW2: } 0.75 A \cdot B^2 \cdot a_3 \cdot \cos(2\omega_B t + 2\Phi_B + \omega_A t \Phi_A) \quad (7)$$

The transfer function of a general non ideal transmitter and the signals transmitted from such a transmitter can all be regarded as continuous, i.e. there are no discontinuities. Thus, the unknowns A, $\omega_A$, $\Phi_A$, B, $\omega_B$, $\Phi_B$ (i.e. the signal T) and $a_1$, $a_3$ needed to define the model $S_T = a_1 \cdot T + a_3 \cdot T^3$ in expression (2) can e.g. be solved for by a curve fitting method (e.g. like Newton's method or a Gauss-Newton algorithm or similar) and/or by assumptions and simplifications. This is well known to those skilled in the art and it needs no further description.

Figure 7:
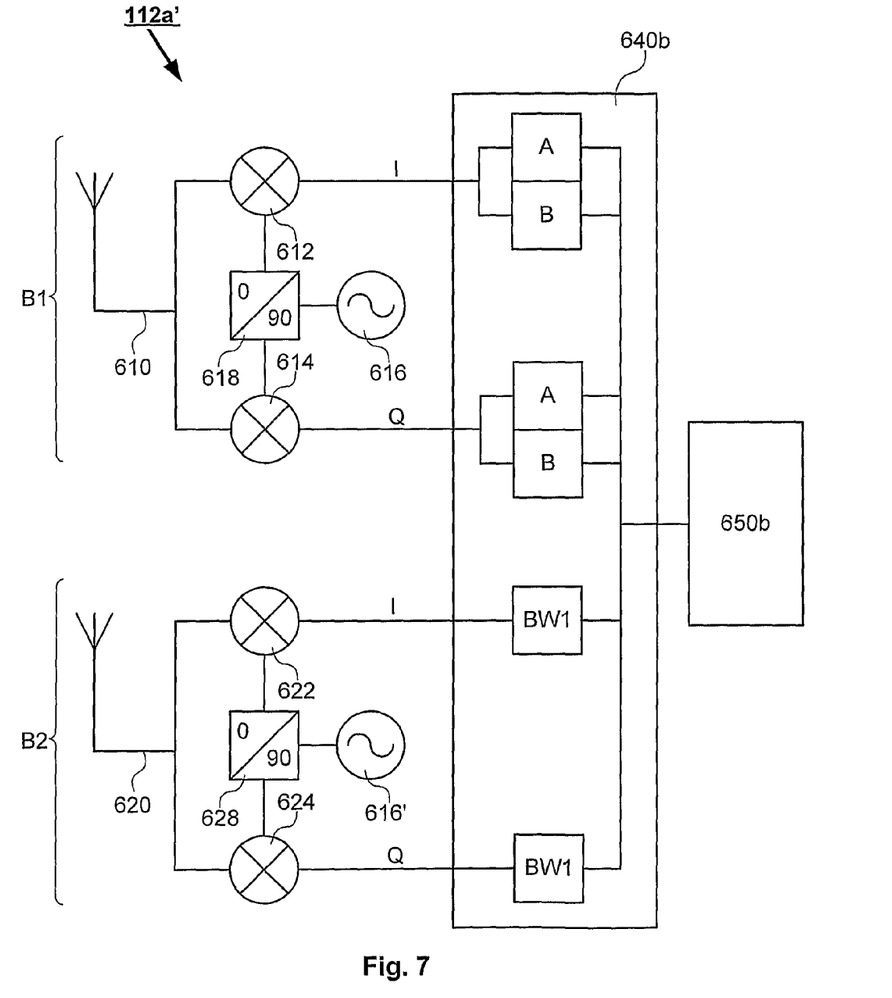
FIG. 7 shows a schematic illustration of a narrow band solution provided in the receiver 112a' comprising a measuring unit 640b implementing the band-pass filters A, B and BW1.

FIG. 7 shows a schematic illustration of a narrowband embodiment of the present invention provided in the receiver 112$a'$ comprising a measuring unit 640$b$ implementing the band-pass filters A, B and BW1 described above. As can be seen in FIG. 7 the receiver 112$a'$ supports space diversity in the same manner as described above with reference to FIG. 6. Likewise, the first diversity branch of the embodiment in FIG. 7 comprises the first and second band-pass filters A and B for measuring the linear term $a_1 \cdot T$ of the interfering signal $S_i$ in the same manner as described above with reference to FIG. 6. However, the second diversity branch only comprises the third band-pass filter BW1 for measuring the third order nonlinear term $a_3 \cdot T^3$ of the signals detected by filters A and B. In this capacity the third band-pass filter BW1 operates in the same manner as described above with reference to FIG. 6. Here, the second diversity branch can be arranged for a narrowband reception within channel n only. Hence, the 90° phase changer 618 is still connected to the oscillator 616, whereas the 90° phase changer 628 is connected to another oscillator 616'.

If we apply the example described with reference to expressions (3) to (7) above to the embodiment in FIG. 7 we will lose the information provided by BW2 and the unknowns A, $\omega_A$, $\Phi_A$, B, $\omega_B$, $\Phi_B$ and $a_1$, $a_3$ has to be solved for without assistance from expression (7). Hence, the calculation unit 650$b$ in FIG. 7 will operate in a slightly different manner.

Figure 8:
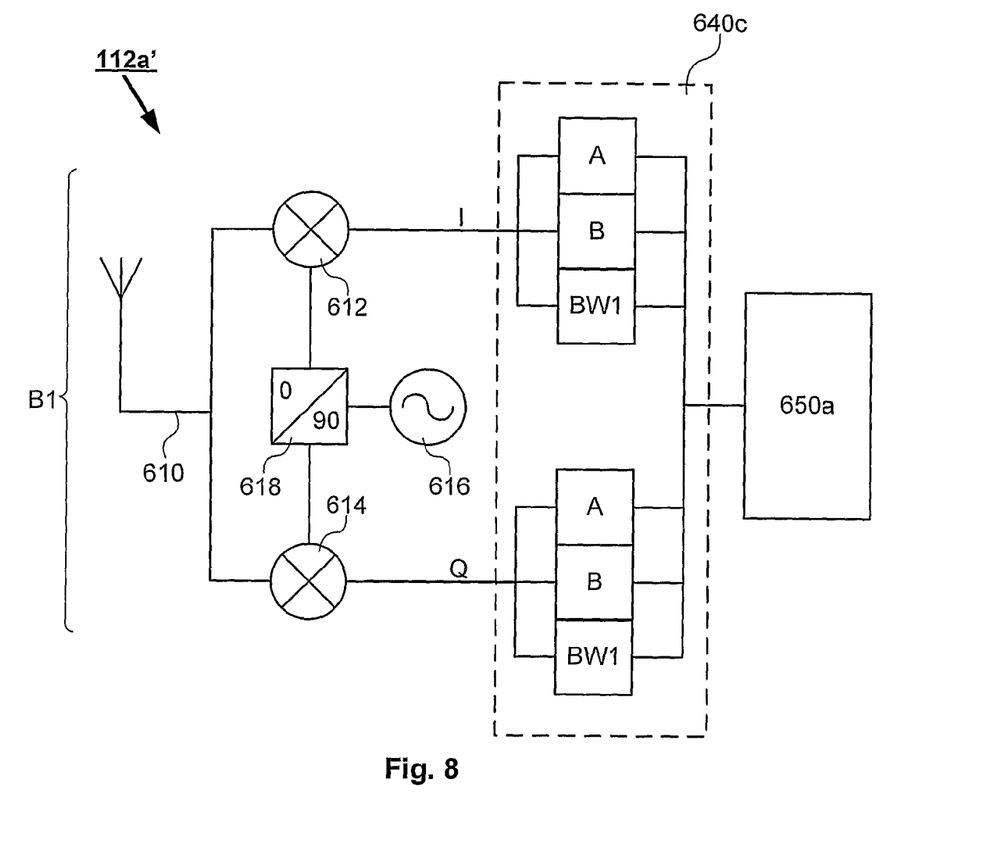
FIG. 8 shows a schematic illustration of another narrowband solution provided in the receiver 112a' comprising a measuring unit 640b implementing the band-pass filters A, B and BW1 in a single diversity branch.

FIG. 8 shows a schematic illustration of an alternative narrowband embodiment of the present invention provided in the receiver 112$a'$ comprising a measuring unit 640$c$ implementing the band-pass filters A, B, BW1 and BW2 described above. Though it is not necessary, it is assumed that the receiver 112$a'$ in FIG. 8 supports space diversity in the same manner as described above with reference to FIG. 6 and FIG. 7, i.e. it is assumed that the receiver 112$a'$ comprises a first diversity branch and a second diversity branch (not shown in FIG. 8, see FIG. 11). The first diversity branch comprises the first and second band-pass filters A and B for measuring the linear term $a_1 \cdot T$ of the interfering signal $S_i$, and the second and third band-pass filters BW1 and BW2 for measuring the third order nonlinear term $a_3 \cdot T^3$ of the signals detected by filters A and B. In this capacity the band-pass filters A, B, BW1 and BW2 operate in the same manner as described above with reference to FIG. 6. Here, the second diversity branch (not shown in FIG. 8) can be arranged for a narrow-band reception within channel n only.

Figure 9:
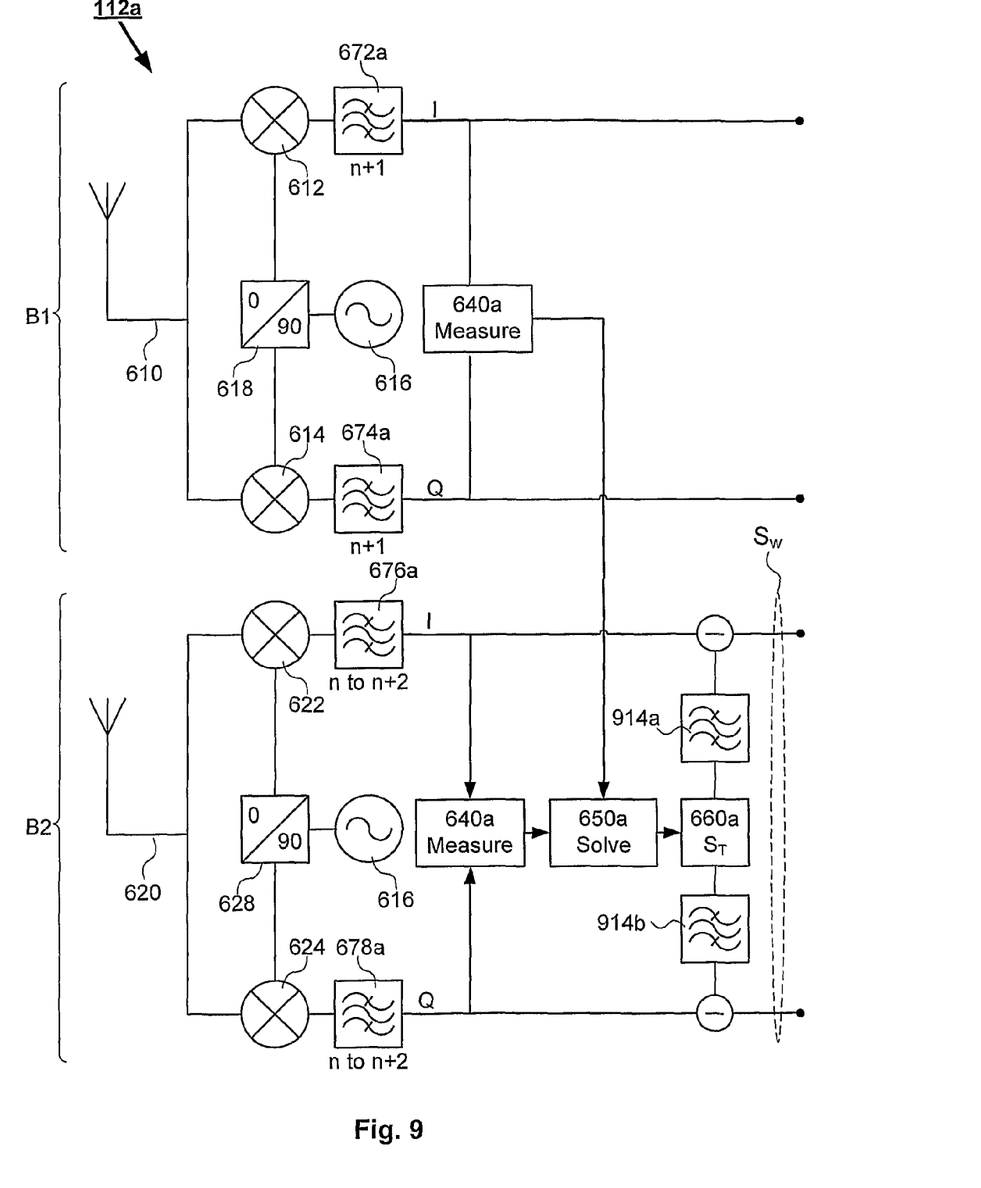
FIG. 9 shows a schematic illustration of an interfering reduction system according to an embodiment of the present invention.

In a fourth step S4 of the exemplifying method it is preferred that the assumed model $S_T = a_1 \cdot T + a_3 \cdot T^3$ in (2) is solved by means of the measurements obtained in the third step S3 as described above. It is particularly preferred that the signal T and the coefficients $a_1$ and $a_3$ are solved for. As mentioned before, this may e.g. be done by a curve fitting method (e.g. like Newton's method or a Gauss-Newton algorithm or similar) and/or by assumptions and simplifications. Once the model is solved it is preferred that the model is set up and defined (i.e. implemented) in a transmitter-model unit 660a of the access point 112a, see e.g. FIG. 9 showing a schematic illustration of an interfering reduction system implemented in the first access point 112a according to an embodiment of the present invention. The interfering reduction system in FIG. 9 utilizes the measuring unit 640a and the calculation unit 650a previously described with reference to FIG. 6. The calculation unit 650a is connected to the transmitter-model unit 660a for communicating the signal T and the coefficients $a_1$, $a_3$ so that the transmitter-model unit 660a can set to up and define the assumed model in (2). As can be seen in FIG. 9, since the measuring unit 640a is used it follows that the receiver filters 672a, 674a in the first diversity branch are tuned to cover the frequency channel n+1 whereas the receiver filters 676a, 678a in the second diversity branch are tuned to cover the frequency channels n, n+1 and n+2. Hence, the wanted signal $S_w$ can only be detected in the second diversity branch, at least during setup of the assumed model in (2). A detection of the wanted signal $S_w$ can only be made through a broadly defined frequency span comprising all the channels n, n+1 and n+2, which will decrease the performance, e.g. with respect to the signal to interference ratio (SIR).

Figure 10:
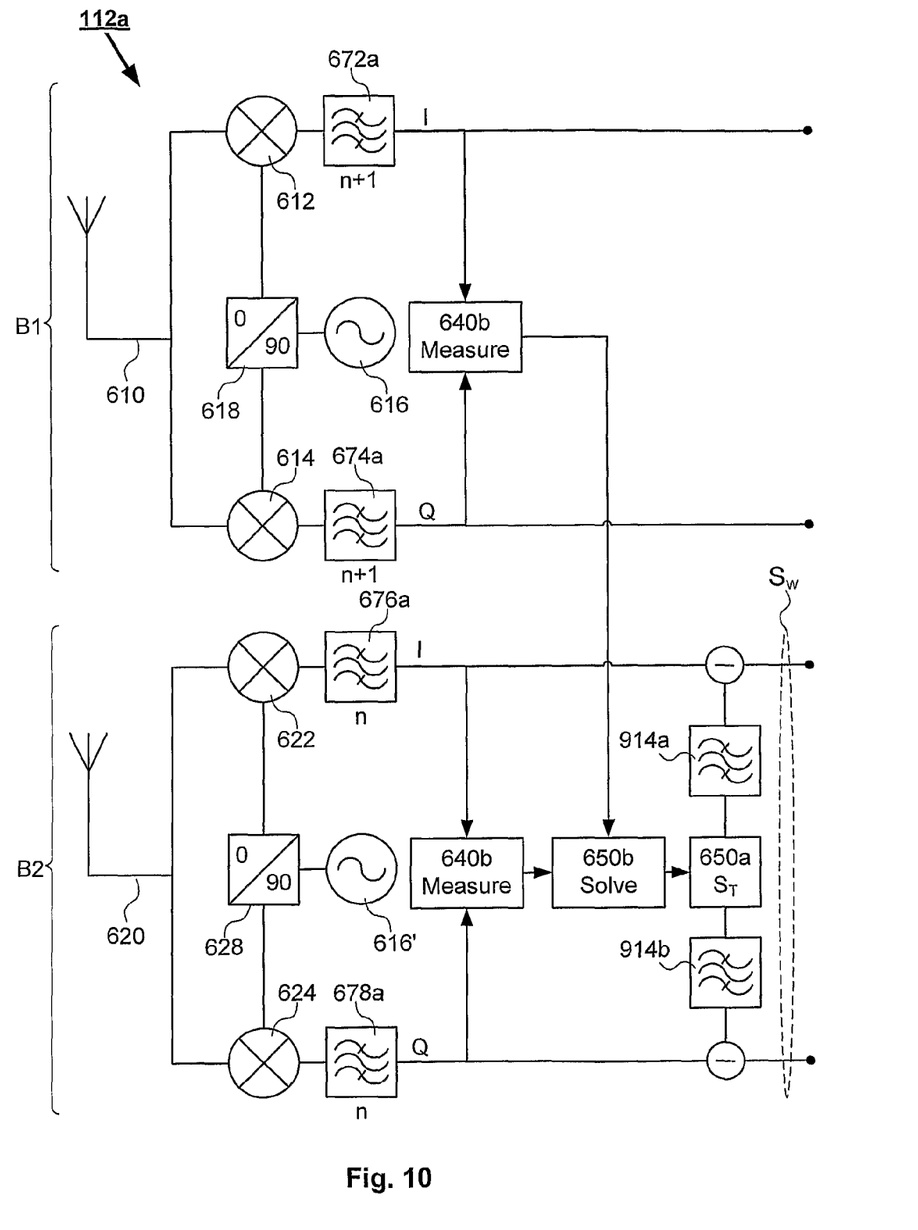
FIG. 10 shows a schematic illustration of another interfering reduction system according to an embodiment of the present invention.

An alternative interfering reduction system is shown in FIG. 10 which utilizes the measuring unit 640b and the calculation unit 650b previously described with reference to FIG. 7. The interfering reduction system in FIG. 10 is the same or similar as the one previously described with reference to FIG. 9. However, since the measuring unit 640b is used it follows that the receiver filters 672a, 674a in the first diversity branch are tuned to cover the frequency channel n+1, whereas the receiver filters 676a, 678a in the second diversity branch are tuned to cover the frequency channel n. Hence, a detection of the wanted signal $S_w$ can be made through a narrowly defined frequency span only comprising channel n, which will increase the performance, e.g. with respect to the signal to interference ratio (SIR).

Figure 11:
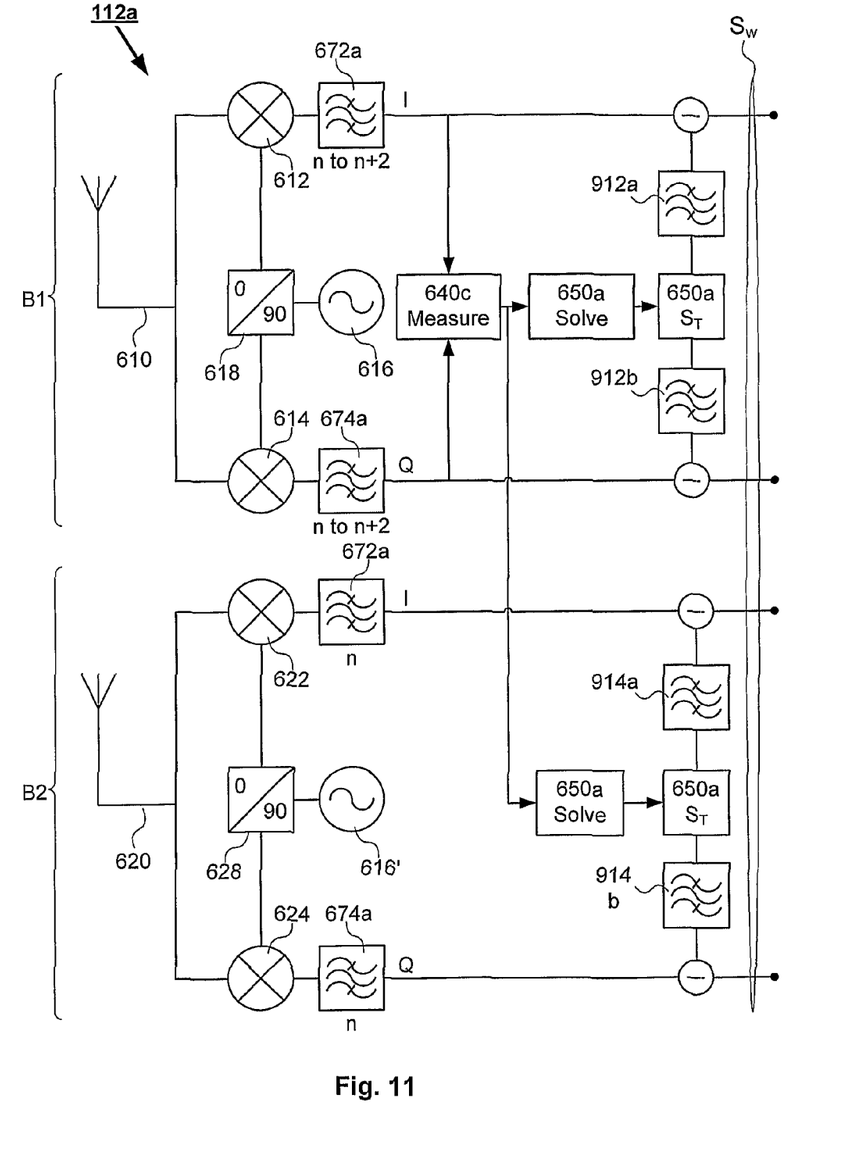
FIG. 11 shows a schematic illustration of still another interfering reduction system according to an embodiment of the present invention.

Another alternative interfering reduction system is shown in FIG. 11 which utilizes the measuring unit 640c and the calculation unit 650a previously described with reference to FIG. 6 and FIG. 8. The interfering reduction system in FIG. 11 is the same or similar as the one previously described with reference to FIG. 9 and FIG. 10. However, since the measuring unit 640c is used it follows that the receiver filters 672a, 674a in the first diversity branch are tuned to cover the frequency channels n, n+1 and n+2, whereas the receiver filters 676a, 678a in the second diversity branch can be tuned to only cover the frequency channel n. Hence, a detection of the wanted signal $S_w$ can be made through a narrowly defined frequency span only comprising channel n, which will increase the performance, e.g. with respect to the signal to interference ratio (SIR). Moreover, the measuring unit 640c will only affect the first diversity branch, whereas the second diversity branch can be left as it is for a continuous detection of the wanted signal $S_w$. This has the potential of simplifying the implementation of the reduction system in FIG. 11.

In a fifth step S5 of the exemplifying method it is preferred that the part of the interfering signal $S_i$ occurring in the wanted channel n is subtract from the signal detected by the receiver 112a' in the wanted channel n. Turning to FIG. 9 and FIG. 10 this can be done by providing the solved signal T into the assumed model $S_T = a_1 \cdot T + a_3 \cdot T^3$ in (2) being set up in the transmitter-model unit 660a, 660b as described in the previous step S4. It is particularly preferred that signal T is substantially continuously solved and provided to the transmitter-model unit 660a, 660b. Indeed, the coefficients $a_1$ and $a_3$ may also be solved defined and set up in the transmitter-model unit 660a, 660b in a continuous manner, but assuming that the transfer function of the transmitter 112b' is stable over time this may be done at a lower periodicity.

The transmitter-model unit 660a, 660b inserts the received signal T into the previously assumed and set up model $S_T = a_1 \cdot T + a_3 \cdot T^3$ in (2), whereby the output signal from the assumed model $S_T$ will correspond to the interfering signal $S_i$. The I-channel of the interfering signal $S_i$ is then filtered by a first band-pass filter 914a of the second diversity branch tuned into the wanted channel n so as to produce the parts of the interfering signal $S_i$ occurring in the wanted channel n. Similarly, the Q-channel of the interfering signal $S_i$ is then filtered by a second band-pass filter 914b of the second diversity branch tuned into the wanted channel n so as to produce the parts of the interfering signal $S_i$ occurring in the wanted channel n. These parts are then subtracted from the I-channel and the Q-channel respectively comprising the signal detected by the receiver 112a in the channel n, i.e. detected by the second diversity branch.

Turning to FIG. 11the above can be done in a slightly different manner. Here, the output signal $S_T$ corresponding to the interfering signal $S_i$ is accomplished in the same or similar manner as described above and the parts of the interfering signal $S_i$ occurring in the I- and Q-channel of the signal detected by the receiver 112a in channel n is subtracted in the same or similar manner as described above.

However, in FIG. 11 the I-channel of the interfering signal $S_i$ may also be filtered by a third band-pass filter 912a tuned into the wanted channel n so as to produce the parts of the interfering signal $S_i$ occurring in the wanted channel n, whereas the Q-channel of the interfering signal $S_i$ may be filtered by a fourth band-pass filter 912b tuned into the wanted channel n so as to produce the parts of the interfering signal $S_i$ occurring in the wanted channel n. These parts may then be subtracted from the I-channel and the Q-channel respectively comprising the signal detected by the receiver 112a in the channel n, i.e. detected by the first diversity branch.

It should be added that in practice a delay function may be required in FIGS. 9, 10 and 11 to compensate for the delay caused by the operation in the measure, solve and subtract functions. Such an delay may e.g. be introduced in each diversity branch after the receiver filter filters 672a, 674a, 676a, 678a respectively but before the subtraction point.

One thing that has not been mentioned above is that the wanted signal $S_w$ will be part of the measurement within the band-pass filter BW1 and a third signal might be part of measurement in the band-pass filter BW2. If one is to use the measurement within BW2 then the third signal has to be low. If the wanted signal is 16 dB below the interfering signal within the wanted channel (Y-X) then it will influence the amplitude by 0.1 dB.

However, the wanted signal $S_w$, the third signal and the interfering signal $S_i$ are typically uncorrelated. One solution is to use average when calculating the unknowns A, $\omega_A$, $\Phi_A$, B, $\omega_B$, $\Phi_B$. Over time the error introduced from the wanted signal and the third signal is averaged out.

Another solution is to negligee the influence of the wanted signal $S_w$ and a possible third signal and calculate with out removing them. This gives an error in the model.

A third solution is to use a trial and error technique to find the phase and amplitude that lower the interferer signal and preserves the wanted signal.

For all solutions following holds true. To speed up calculation and minimize the error introduced in the calculation of the model, one should keep the amplitudes of the wanted signal $S_w$ and a possible third signal as low as possible compared to the amplitudes of the Im3 tones caused by the interferer.

The invention increases the receiver sensitivity in tough interfering environments. Moreover, the invention makes the wireless connection more reliable for e.g. emergency calls. No extra components needed, since the filters etc can be implemented by means of software.

The present invention has now been described with reference to exemplifying embodiments. However, the invention is not limited to the embodiments described herein. On the contrary, the full extent of the invention is only determined by the scope of the appended claims.

The invention claimed is:

1. A method for reducing the influence of an interfering signal ($S_i$) on a wanted signal ($S_w$) in a first frequency channel (n) received by a receiver when the interfering signal ($S_i$) occurs in a second frequency channel (n+1) near to the first channel (n), which method in an access point comprises the steps of:
   assuming a model ($S_T$) of a transmitter causing the interfering signal ($S_i$),
   obtaining in the first channel (n) a measure of the wanted signal ($S_w$) and a measure of a nonlinear part of the interfering signal ($S_i$), and in the second channel (n+1) a measure of a linear part of the interfering signal ($S_i$),
   solving the model for said transmitter by using the measured linear and nonlinear part,
   obtaining the interfering signal ($S_i$) influencing the first channel (n) by using the solved model, and
   subtracting the obtained interfering signal ($S_i$) from the wanted signal ($S_w$) received by the receiver, wherein said receiver comprises a first receiving branch and a second receiving branch for supporting space diversity, the method further comprising the steps of:
   obtaining said wanted signal ($S_w$) and said nonlinear part of the interfering signal ($S_i$) by measuring in the second branch, and
   obtaining said linear part of the interfering signal ($S_i$) by measuring in the first branch.

2. The method according to claim 1, which method comprises the steps of:
   obtaining in a third frequency channel (n+2) near to the second frequency channel (n+1) an additional measure of said nonlinear part of the interfering signal ($S_i$).

3. The method according to claim 2, which method comprises the steps of,
   obtaining in the second channel (n+1) a measure of said linear part of the interfering signal ($S_i$) by using a first band-pass filter tuned to a first edge of the frequency span (x) of the interfering signal ($S_i$), and a second band-pass filter tuned to a second edge of the frequency span (x) of the interfering signal ($S_i$), and
   obtaining in the first channel (n) a measure of said nonlinear part of the interfering signal ($S_i$) by using a third band-pass filter tuned to a nonlinearity of the signals detected by said first and second band-pass filters, and
   obtaining in a third frequency channel (n+2) a measure of said nonlinear part of the interfering signal ($S_i$) by using a fourth band-pass filter tuned to a nonlinearity of the signals detected by said first and second band-pass filters.

4. The method according to claim 3 wherein said band-pass filters are narrow band filters arranged so as to detect substantially one single frequency.

5. The method according to claim 1 wherein the method further comprises the step of:
   obtaining said nonlinear part of the interfering signal ($S_i$).

6. The method according to claim 1, which method comprises the steps of,
   solving the model ($S_T$) with respect to parameters indicative of the linear properties ($a_1$, $a_3$) of the original signal (T) being fed to the transmitter causing the interfering signal ($S_i$), and
   obtaining the interfering signal ($S_i$) in the first channel (n) by providing said parameters ($a_1$, $a_3$, T) to the solved model and filtering the obtained interfering signal ($S_i$) by a filter tuned to the first channel (n).

7. The method according to claim 1, which method comprises the steps of,
   solving the model ($S_T$) by means of a curve fitting method.

8. The method according to claim 1, which method comprises the steps of,
   obtaining in the second channel (n+1) a measure of said linear part of the interfering signal ($S_i$) by using a first band-pass filter tuned to a first edge of the frequency span (x) of the interfering signal ($S_i$), and a second band-pass filter tuned to a second edge of the frequency span (x) of the interfering signal ($S_i$), and
   obtaining in the first channel (n) a measure of said nonlinear part of the interfering signal ($S_i$) by using a third band-pass filter tuned to a nonlinearity of the signals detected by said first and second band-pass filters.

9. The method according to claim 8 wherein said band-pass filters are narrow band filters arranged so as to detect substantially one single frequency.

10. The method according to claim 1, wherein said nonlinear part of the interfering signal ($S_i$) is a third order nonlinear part of said linear part of the interfering signal ($S_i$).

11. The method according to claim 1, wherein the model of the transmitter causing the interfering signal ($S_i$) is assumed to be $$S_T = a_1 \cdot T + a_3 \cdot T^3,$$

wherein
   T is the original signal being fed to the transmitter, $a_1 \cdot T$ is a linear term with $a_1$ being the gain of the transmitter and the term $a_3 \cdot T^3$ defines the third order nonlinearity of the transmitter.

12. An access point configured to perform the method according to claim 1.

13. A method for reducing the influence of an interfering signal ($S_i$) on a wanted signal ($S_w$) in a first frequency channel (n) received by a receiver when the interfering signal ($S_i$) occurs in a second frequency channel (n+1) near to the first channel (n), which method in an access point comprises the steps of:
   assuming a model ($S_T$) of a transmitter causing the interfering signal ($S_i$),
   obtaining in the first channel (n) a measure of the wanted signal ($S_w$) and a measure of a nonlinear part of the interfering signal ($S_i$), and in the second channel (n+1) a measure of a linear part of the interfering signal ($S_i$), solving the model for said transmitter by using the measured linear and nonlinear part, obtaining the interfering signal ($S_i$) influencing the first channel (n) by using the solved model, and subtracting the obtained interfering signal ($S_i$) from the wanted signal ($S_w$) received by the receiver, wherein a power level of the wanted signal ($S_w$) in the first channel (n) is lower than a power level of the interfering signal ($S_i$) in the first channel (n).

14. A method for reducing the influence of an interfering signal ($S_i$) on a wanted signal ($S_w$)) in a first frequency channel (n) received by a receiver when the interfering signal ($S_i$) occurs in a second frequency channel (n+1) near to the first channel (n), which method in an access point comprises the steps of:

assuming a model ($S_T$) of a transmitter causing the interfering signal ($S_i$), obtaining in the first channel (n) a measure of the wanted signal ($S_w$) and a measure of a nonlinear part of the interfering signal ($S_i$), and in the second channel (n+1) a measure of a linear part of the interfering signal ($S_i$), solving the model for said transmitter by using the measured linear and nonlinear part, obtaining the interfering signal ($S_i$) influencing the first channel (n) by using the solved model, and subtracting the obtained interfering signal ($S_i$) from the wanted signal ($S_w$) received by the receiver, wherein the obtaining in the second channel (n+1) the measure of the linear part of the interfering signal ($S_i$) comprises measuring the interfering signal ($S_i$) at a first frequency ($f_A$) and at a second frequency ($f_B$) of the second channel (n+1), and wherein the obtaining in the first channel (n) the measure of the wanted signal ($S_w$) and the measure of the nonlinear part of the interfering signal ($S_i$) comprises measuring the wanted signal ($S_w$) and the interfering signal ($S_i$) at a third frequency that is a linear combination of the first frequency ($f_A$) and the second frequency ($f_B$).

15. A method for reducing influence of an interfering signal, comprising:

determining, at a first filter coupled to a first antenna, a first signal value of a signal at a first frequency of a frequency channel;

determining, at a second filter coupled to a second antenna, a second signal value of the signal at a second frequency of an adjacent frequency channel;

determining, based on the first signal value and the second signal value, a plurality of parameter values of a transmitter model representing an interfering signal having a nonlinear part in the frequency channel and a linear part in the adjacent frequency channel, wherein the nonlinear part is a quadratic or cubic function of a wanted signal;

obtaining, based on the model, the nonlinear part of the interfering signal;

adjusting, based on the obtained nonlinear part, a third signal value measured in the frequency channel, wherein the signal is a combination of at least the interfering signal and the wanted signal, and wherein a power level of the interfering signal in the frequency channel is greater than a power level of the wanted signal in the frequency channel.

16. The method of claim 15, wherein the third signal value is one of a plurality of signal values corresponding to a span of frequencies that includes the frequency channel, the adjusting further comprising subtracting each of the plurality of signal values by the obtained nonlinear part of the interfering signal.

17. The method of claim 15, wherein the third signal value is measured from a signal that is received after the obtaining of the nonlinear part of the interfering signal.

18. The method of claim 15, further comprising determining an additional signal value of the signal at an additional frequency of the adjacent frequency channel, wherein the determining the one or more parameter values of the model is further based on the additional signal value.

19. A signal processing apparatus, comprising:

a plurality of wireless receivers;

a first bandpass filter coupled to a first of the wireless receivers and tuned to a first frequency of a frequency channel;

a second bandpass filter coupled to a second of the wireless receivers and tuned to a second frequency of an adjacent frequency channel;

a calculation unit configured to:

receive, from the first bandpass filter, a first signal value of a signal;

receive, from the second bandpass filter, a second signal value of the signal;

determine, based on the first signal value and the second signal value, a plurality of parameter values of a model representing an interfering signal having a nonlinear part in the frequency channel and a linear part in the adjacent frequency channel, wherein the nonlinear part is a quadratic or cubic function of a wanted signal;

obtain, based on the model, the nonlinear part of the interfering signal;

adjust, based on the obtained nonlinear part, a third signal value obtained from the first bandpass filter or the second bandpass filter, wherein the signal is a combination of at least the interfering signal and the wanted signal, and wherein a power level of the interfering signal in the frequency channel is greater than a power level of the wanted signal in the frequency channel.

* * * * *

UNITED STATES PATENT AND TRADEMARK OFFICE
CERTIFICATE OF CORRECTION

| | | |
|---|---|---|
| PATENT NO. | : 8,693,954 B2 | Page 1 of 1 |
| APPLICATION NO. | : 12/999531 | |
| DATED | : April 8, 2014 | |
| INVENTOR(S) | : Mattsson | |

It is certified that error appears in the above-identified patent and that said Letters Patent is hereby corrected as shown below:

In the Specification

In Column 6, Line 6, delete "the lo" and insert -- the --, therefor.

In Column 7, Line 8, delete "point 120a." and insert -- point 112a. --, therefor.

In Column 7, Line 16, delete "point 120a." and insert -- point 112a. --, therefor.

In Column 8, Line 24, delete "transmitter 120b." and insert -- transmitter 120b'. --, therefor.

In Column 10, Line 17, in Equation (7), delete "$(2\omega_B t+2\Phi_B+\omega_A t\Phi_A)$" and insert
-- $(2\omega_B t+2\Phi_B+\omega_A t+\Phi_A)$ --, therefor.

In Column 11, Line 24, delete "set lo" and insert -- set --, therefor.

In Column 12, Line 31, delete "receiver 112a" and insert -- receiver 112a' --, therefor.

In Column 12, Line 33, delete "FIG. lithe" and insert -- FIG. 11 the --, therefor.

In Column 12, Line 38, delete "receiver 112a" and insert -- receiver 112a' --, therefor.

In Column 12, Line 49, delete "receiver 112a" and insert -- receiver 112a' --, therefor.

In the Claims

In Column 14, Line 4, in Claim 3, delete "$(S_1)$" and insert -- $(S_i)$ --, therefor.

In Column 15, Line 13, in Claim 14, delete "$(S_w))$" and insert -- $(S_w)$ --, therefor.

Signed and Sealed this
Second Day of September, 2014

Michelle K. Lee
*Deputy Director of the United States Patent and Trademark Office*